United States Patent [19]

Cook

[11] 3,946,754
[45] Mar. 30, 1976

[54] GAS METER DISCONNECT DEVICE

[76] Inventor: Robert W. Cook, 125 Grant St., Decatur, Ind. 40733

[22] Filed: Apr. 24, 1975

[21] Appl. No.: 571,288

Related U.S. Application Data

[62] Division of Ser. No. 483,672, June 27, 1974, abandoned.

[52] U.S. Cl. .................. 137/315; 73/201; 137/15; 285/30
[51] Int. Cl.² .......................................... F16K 43/00
[58] Field of Search ............ 73/201, 262, 272, 273, 73/274; 137/15, 315; 285/12, 18, 30

[56] References Cited
UNITED STATES PATENTS

| | | | |
|---|---|---|---|
| 3,310,322 | 3/1967 | Carroll | 285/18 |
| 3,615,159 | 10/1971 | Munoz | 137/15 |

Primary Examiner—Martin P. Schwadron
Assistant Examiner—George L. Walton
Attorney, Agent, or Firm—Woodard, Weikart, Emhardt & Naughton

[57] ABSTRACT

Disclosed in an apparatus and method for changing or replacing domestic or residential-type gas meters without interrupting the gas supply to the service line downstream of the meter and obviating the necessity of shutting off the gas water heater, furnace on other gas appliances in the dwelling. The apparatus includes a member which is clamped around the outlet fitting of the gas meter. A slide carried by the member is moveable to simultaneously close the meter outlet and to introduce an alternate supply of gas to the service line downstream of the meter. After the normal gas supply to the meter inlet is shut off, the meter is removed and a replacement meter is installed by attaching its inlet to the gas supply line and its outlet to aforementioned member. The slide is then again moved to simultaneously place the meter outlet in communication with the service line and to shut off the alternate gas supply.

6 Claims, 9 Drawing Figures

GAS METER DISCONNECT DEVICE

This is a division of application Ser. No. 483,672, filed June 27, 1974, now abandoned.

BACKGROUND OF THE INVENTION

Domestic gas meters are systematically replaced at regular intervals (every ten years, for example). Meter malfunction also may require meter replacement outside the regular replacement cycle. Systematic replacement or repair of domestic gas meters has always encountered the difficulty that gas service to the home whose meter was to be replaced had to be shut off. This necessitated entry into the home to relight the pilot burners of the various gas appliances, bleeding of interior gas lines where necessary, etc. Since access to the interior of the home was required, even where the meter itself was installed on the exterior of the home, temporary absence of the occupants required numerous call-backs delaying coverage of specific areas or blocks of homes.

While various attachments or fittings for removing and replacing gas meters are not unknown in the prior art, such devices invariably require modification of existing meters or a specialized configuration of the meter itself, solutions having obvious economic disadvantages for the gas utility company using this equipment. Another attempted solution to the problem has been the use of a by-pass meter bar which, by use of manual valves joined with the by-pass bar, can by-pass and isolate the gas meter temporarily so that it can be replaced without shutting off gas service. The inherent presence of a usable tap on the upstream side of the meter has the disadvantage for the gas utility company in that it is an invitation to surreptitious, wrongful use of unmetered gas.

The present invention provides an apparatus and method for removing and replacing domestic gas meters without interrupting the gas supply, and requiring no permanent alteration of the meter. The apparatus is of relatively simple construction and appreciably reduces the time necessary to perform the meter changing operation, requires no altering or permanent attachments to the gas meter and involves no taps in the service line upstream of the meter.

DESCRIPTION OF THE PREFERRED EMBODIMENT

Figure 1:
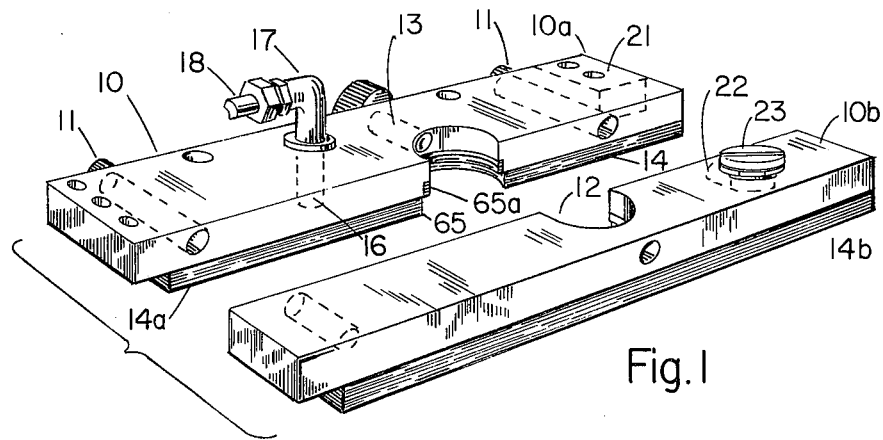
FIG. 1 is a perspective, exploded view of the top plate component of the apparatus of the present invention.

Referring initially to FIGS. 1–5 and, initially, to FIG. 1, the apparatus of the present invention includes a top plate indicated generally at 10 which is made up of plate components 10a and 10b, removably joined together by means of through-studs 11, the apertures through which the studs extend being threaded in the component 10b and unthreaded in the component 10a so as the studs 11 are turned, the plate component 10b is drawn edge-to-edge against plate component 10a. An aperture 12 extends through the plate 10, the aperture being bisected so that half of the aperture is formed in the plate component 10a and the other half in the plate component 10b. The aperture 12 is sized to accommodate the gas meter service pipe portion or fitting which is joined to the gas meter outlet and a locking screw 13 extends through the plate component 10a and permits locking of the plate onto the fitting or pipe extending through the aperture 12. The underface of the plate 10 has adhered to it a layer of elastomeric material such as rubber, this rubber underface for the plate being indicated at 14 and 14a. As will be evident from FIG. 1 the resilient rubber material bonded to the bottom surface of the top plate components terminates at a point spaced from the left-hand end of the plate components.

Extended completely through the plate 10a and its elastomeric underlayer is an aperture 16 to which is attached a fitting 17 communicating with a tube 18. As will be pointed out subsequently in describing the operation of the apparatus of the present invention, the tube 19 communicates with an auxiliary or alternate source of gas supply which may preferably take the form of a cylinder of natural gas under elevated pressure. The cylinder may be carried on a small two-wheel cart and connected through a pressure regulator to the tube 18. The maintenance cart may be sized so as to accommodate the cylinder, the regulator valve, tools and the gas meter which is to replace the meter to be removed. The cart itself and the gas supply cylinder are not shown herein since their arrangement and use is well known in the art. Depending from the undersurface of the plate component 10a is a block 21 which is secured by any suitable means to the plate component and which extends through a cutaway portion of the elastomeric layer 14. A small aperture 22 extends through the plate component 10b and through its underlying rubber surface 14a. The aperture 22 is closed at its upper end by means of the threaded plug 23 which can be removed from the aperture and subsequently replaced to again reclose it.

Figure 2:
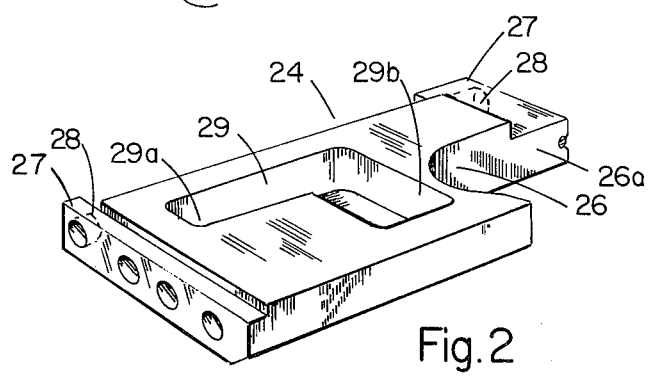
FIG. 2 is a perspective view of the slide plate taken from its upper face.

Referring to FIG. 2, a slide plate 24 is shown and this plate underlies, and its top surface is contiguous with, the surface of the rubber facings 14 and 14a of the top plate component 10a and 10b, the rubber layer providing a resilient interface between the plates. One end of the slide plate has a cutaway portion having a curved boundary 26 which merges into a generally rectilinear boundary portion 26a. The slide plate has sidewardly extending portions or blocks 27 which carry registering, threaded apertures 28. The plate 24 has a central, generally L-shaped depression 29 in it which, it will be understood, does not extend completely through the plate. The L-shaped depression is formed by the merging longitudinal leg portion 29a of the chamber and transverse leg portion 29b of the chamber.

Figure 3:
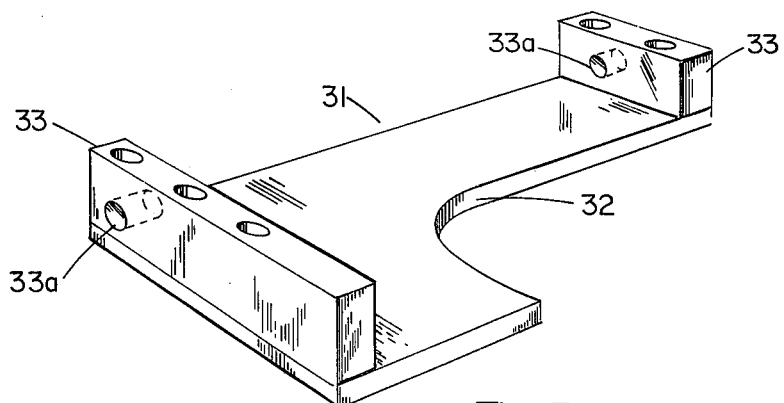
FIG. 3 is a perspective view of the base or bottom plate component taken from its upper face.

Referring now to FIG. 3, the base plate component of the apparatus is indicated generally at 31. It has a cutaway portion having a curved boundary 32 and, attached to each of its ends, upwardly extending blocks 33 having registering apertures 33a.

Figure 4:
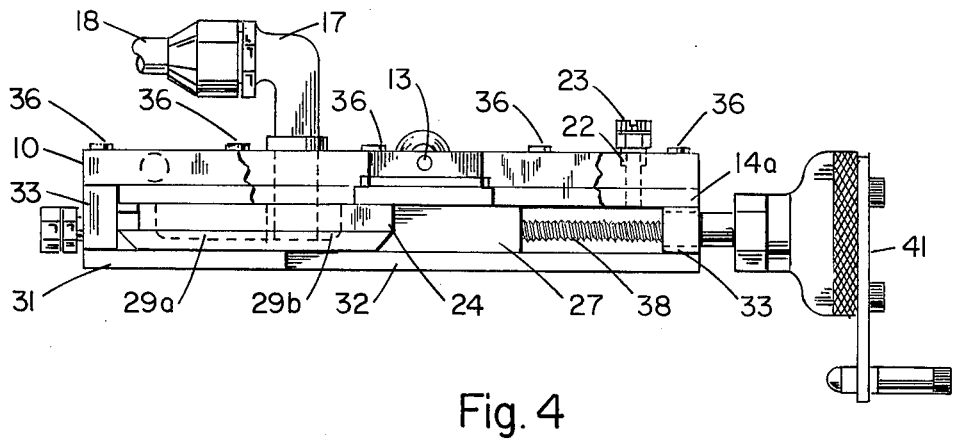
FIG. 4 is a side view of the assembled apparatus of the present invention.
Figure 5:
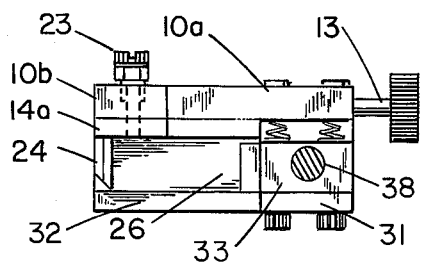
FIG. 5 is an end view (taken from the right-hand end of FIG. 4) of the apparatus shown in FIG. 4.

FIGS. 4 and 5 show the assembled structure. As may be seen in FIG. 4, the top plate 10, slide plate 24 and base plate 31 are arranged in stacked position and held in that position by the screws 36 which extend freely through two of the plates and are threaded into the other plate. Extending freely through the registering apertures 33a in the spaced blocks 33 carried by the base plate is a threaded shaft or traversing rod 38, the threaded shank portion of the rod 38 extending through the registering, threaded apertures 28 (FIG. 2) in the extending portions 27 of the slide plate 24. The ends of the rod (as viewed in FIG. 4) are journalled in the apertures 33a of the blocks 33 carried on the base plate. One end of the rod 38 is provided with a suitable hand crank indicated generally at 41. Rotation of the hand crank rotates the shaft 38 and causes the slide plate 24 to move in a plane parallel to the plane of the top plate, the rod 38 and hand crank 41 providing a translating member to produce such movement.

It will be noted from FIG. 5 that the journalling blocks 33 for the traversing rod 38 extend upwardly to span the thickness of the slide plate 24 and thus act as stops defining a first position or far left-hand limit of motion of the slide plate along the traversing rod, a second position or far right-hand limit of motion being defined by engagement of the right-hand end (as viewed in FIG. 4) of the slide plate 24 with the right-hand journalling block 33.

Figure 6:
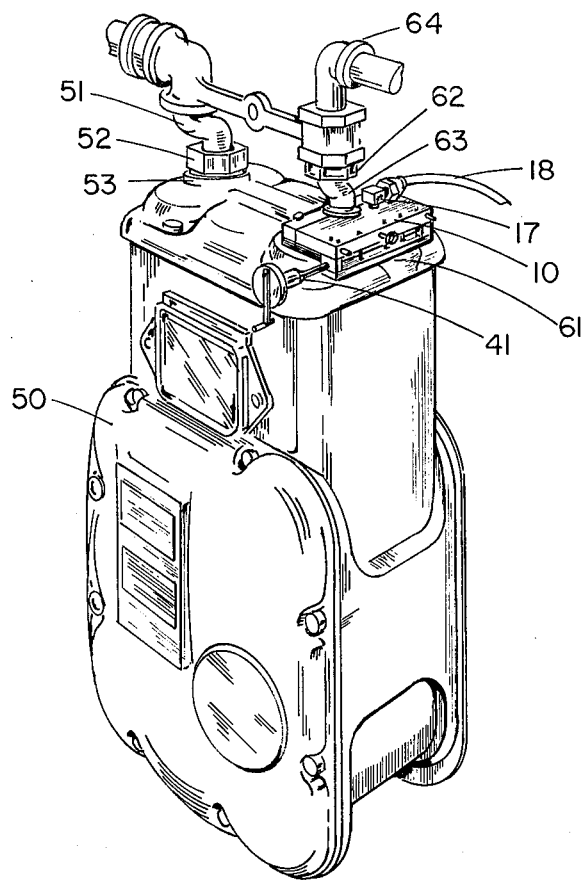
FIG. 6 is a perspective view of the apparatus of the present invention installed on a conventional gas meter with the parts in their positions assumed intermediately in the process of replacing the meter.
Figure 8:
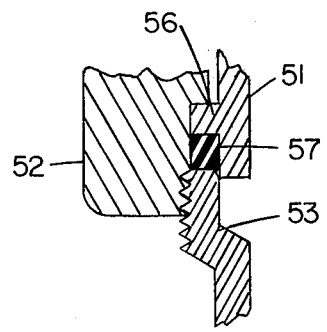
FIG. 8 is an enlarged, fragmentary, sectional view of the meter outlet fitting and the union fitting joining the service line to the gas meter inlet fitting.
Figure 9:
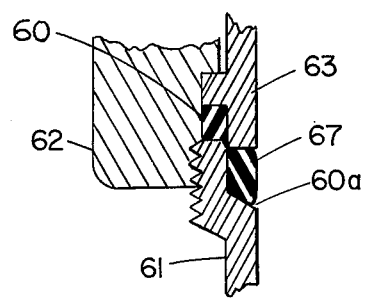
FIG. 9 is a view similar to FIG. 8 but showing a fragmentary cross-section of the meter outlet.

Operation of the apparatus will now be explained in reference to FIGS. 6–8. FIG. 6 illustrates a conventional gas meter in a typical domestic installation in which a gas supply pipe 51 is connected by means of a conventional union fitting having a nut 52 which is threaded upon an externally threaded meter inlet 53. As may be seen in FIG. 8 the nut 52 of the union joint draws a shoulder 56 on the pipe 51 tightly against an elastomeric gasket 57 which abuts the outer end of the externally threaded meter inlet 53. The meter is also provided with an externally threaded outlet 61 which, in the completed installation, is threadedly received in a nut 62 which forms the union joint between the outlet and the shouldered outlet fitting or pipe 63. The pipe 63 communicates with the service pipe 64 which extends to supply gas to the various gas appliances in the dwelling served by the meter 50. The union joint formed at the meter outlet 61 by the nut 62, and shown in FIG. 9, is identical to the corresponding elements of FIG. 8, the elements 61–63 being shown in detail in FIG. 9 but having an additional interior gasket 67 (FIG. 9) for a purpose which will be subsequently explained. As shown in FIG. 6 the nut 62 forming a part of the union joint between the outlet pipe 63 and the meter outlet 61 is shown, not in its normal position of FIG. 9, but loosened and raised upwardly off the fitting, as will subsequently be described, a position in which the nut is placed during the transitional movement of the meter.

When the meter 50 is to be replaced, the nuts 52 and 62 joining the inlet pipe and outlet pipe to the meter inlet and outlet, respectively, are both loosened to hand-tight condition. Under these conditions the meter is still supported at the union joints and pressure on the resilient gaskets 57 in the joints is sufficient to maintain the gas seal. If desired, a supporting, flexible strap (not shown) may be hooked from an adjacent pipe on one side of the meter to an adjacent pipe or abutment on the opposite side of the meter, the strap passing under the meter and serving as a safety support for the meter during the transitional operation. The nut 62 is them completely removed and pushed upwardly, out of the way, on the pipe 63.

Next, the portion 10b of the top plate 10 is separated from the portion 10a, the adjacent portion of the outlet pipe 63 is accommodated in the aperture 12 the slight inset 65 (FIG. 1) of the rubber underfacing of the top plate accommodating the collar on pipe 63 and the annular rubber insert 65a (FIG. 1) bearing against the pipe just above the collar. The two plate components 10a and 10b are then locked together by studs 11 to thus clamp the top plate and the slide plate 24 and base plate 31 carried by the top plate to the outlet pipe 63, the externally threaded meter outlet portion 61 extending substantially to the aperture 12 in the plate 10 and in a position to be engaged by the surface 26 of the slide plate 24 upon movement of the slide plate. With the plate assembly clamped about the outlet pipe as shown in FIG. 6, gas will be flowing through the meter to the outlet pipe. While the auxiliary gas supply tube 18 provides an available alternate supply of gas, since the slide plate 24 is in its position of FIG. 4, that is, its extreme left-hand position (as viewed in FIG. 4) the aperture 17, although it communicates with the supply chamber formed by the L-shaped depression 29 is, in effect, stopped since the supply chamber formed by the depression 29 and the adjacent face of the rubber layer 14 of the plate 10 is closed. The hand crank 41 is then utilized to rotate the threaded rod 38 causing the slide plate 24 to move rightwardly from its extreme left-hand position of FIG. 4 towards its extreme right-hand position. As the slide plate moves, its surface 26a and, subsequently, its curved surface 26 (FIG. 2) will engage the meter outlet 61 and further rightward transversing of the slide plate 24 will begin to pivot the gas meter 50 in a horizontal plane about the centerline of its inlet 53 (FIG. 8) which, as previously mentioned has been loosened somewhat with respect to the cooperating nut 52.

This pivotal motion of the meter permits completion of the rightward traversing of the slide plate, permitting it to reach its extreme right-hand position, and, as the slide plate moves toward this extreme position, the meter outlet 61 will be moved out of registration with the service pipe 63 and the chamber portion 29b will be moved into registration, or communication with, the service pipe 63. Thus as the service pipe 63 is deprived of the gas flowing through the meter from line 61, it has introduced into it gas from the chamber 29, which, it will be recalled is under gas pressure from line 18 and the alternate gas source (pressurized cylinder) connected to it. Assuming that the pressure regulator on the alternate gas source or cylinder is set at the same value as the normal gas pressure in the line 51 (conventionally, 7 inches water column pressure), there is no drop or deviation in gas pressure to downstream service line 64 as its gas supply is transferred from the meter outlet 61 to the chamber 29 because the chamber portion 29b is brought into communication with pipe 63 just prior to movement of the meter outlet 61 out of communication with pipe 63.

As the meter outlet 61 is moved out of communication with the pipe 63 it is, in effect, capped by its sealing engagement with the resilient underface of the top plate 10. The gas supply to the meter inlet, the normal supply in the upstream service line 51 may now be shut off by means of the conventional, manual shut-off valve (not shown) which is just upstream of the meter in domestic installations. Though the conventional supply is cut off gas continues to be supplied through line 18 to pipe 64 from the alternate source.

With the gas supply to the meter inlet 53 shut off, the nut 52 may be turned off the meter inlet and the meter 50 removed and replaced by a new, duplicate meter. FIG. 7 shows a replacement meter 50a, after hand tight attachment of its inlet, by means of union fitting nut 52 (FIG. 6), being moved counterclockwise manually in a horizontal plane so that its inlet 61 is beneath the slot-headed closure 23 of the purging aperture 22 (FIG. 4). Since the meter outlet is thus effectively closed or capped, the manual gas valve in the supply pipe 51 may now be opened and the air in the new meter purged from it by momentarily removing the cap 23 from the aperture 22 and then replacing it. As an alternative the air-purging function can be performed by opening the manual inlet gas valve just before the meter inlet is completely masked or closed by the resilient underside of plate 10 as the meter swings into its position of FIG. 7. As soon as the air is bled from the meter it is moved to its position of FIG. 7 closing off the meter outlet 61.

When a meter is replaced, it is, of course, advisable to replace the resilient gasket 57 (FIG. 8) and its counterpart gasket 60 (FIG. 9) forming a part of the union assembly at the inlet and outlet of the meter respectively. The gaskets, normally formed of a synthetic elastomer such as neoprene, can be stretched over the exterior of the meter portions 53 and 61, respectively, before the meter is lifted into installed position. At the inlet side, which is not under gas pressure at this stage of the operation (the manual valve in the service line 51 having been closed as mentioned above), the old gasket 57 may be removed and discarded, the new one rolled into place at the top of the meter inlet 53 and the nut 52 threaded hand tight into place just after the new meter has been lifted into place. A somewhat different procedure is required for changing the gasket 60 (FIG. 9) on the meter outlet 61 since the meter outlet is continuously under gas pressure, either from the auxiliary source (tube 18) or from the regular service line 51 and through the meter.

Figure 7:
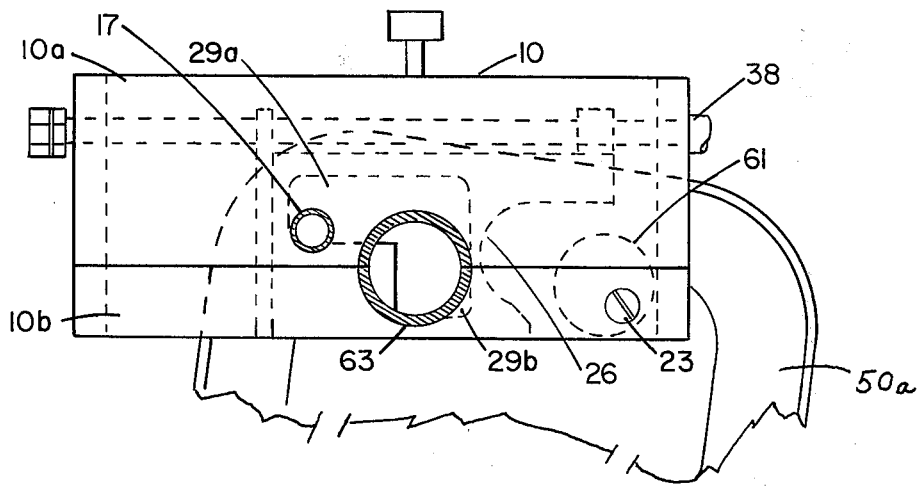
FIG. 7 is a top plan view of the apparatus of the present invention, showing a portion of the gas meter, the parts being shown in their position assumed during the meter changing operation.

With the replacement meter 50a generally in the position shown in FIG. 7 and with cap 23 replaced on the bleed aperture 22, the meter may be manually moved about the center line of pipe 63 until the meter outlet engages the surface 26 on the slide plate. The spindle 38 is then manually rotated to cause the slide plate to retreat leftwardly from its extreme rightward position of FIG. 7, and the meter is manually urged to follow the retreating surface 26 of the slide plate. As the slide plate 24 retreats leftwardly (as viewed in FIG. 7), the meter inlet moves into registration with the downstream service line portion 63 and the portion 29b of the chamber 29 moves out of registration with pipe 73. The overlap in registration permits the gas supply to pipe 63 to be transferred from the alternate supply (tube 18 and chamber 29) to the normal supply (service line 51) without interruption or appreciable pressure variation.

The alternate gas supply, providing gas to the tube 18, may now be shut off and the tube disconnected from the passage 17. By loosening the screws 11, the plate portion 10b may be separated from the plate portion 10a and the assembly removed from the pipe 63, the meter being supported by the strap, previously mentioned, or by any other suitable means. Before the nut 62 is started on the threads to its position of FIG. 9, however, the gasket 60 (FIG. 9) must be replaced. The old gasket can be cut from the assembly and the new one, previously stretched over the exterior threads of the meter outlet as mentioned above, may be then rolled upwardly into position at the upper end of the meter outlet. Because the union assembly is under gas pressure, some means must be provided for maintaining the gas seal in the short time interval between the removal of the old gasket 60 and the proper positioning of the new one. This means is the interior, annular gasket 67 (FIG. 9). Conventional gas meters for domestic use are all provided with an internal shoulder 60a spaced from the upper end of both the outlet and inlet fitting. This spacing of the internal shoulder from the end of the meter fitting may vary somewhat in meters of various manufacture and gaskets 67 of various thickness must be available to the serviceman making the meter change to accommodate the various meter types. Prior to installing a new replacement meter, an annular gasket 67 of proper depth is inseted in the meter outlet and seated against the shoulder 60a (FIG. 9). When the meter is lifted into place and held during the shifting of the slide plate 24, the lower end portion of the fitting or pipe will be forced into compressing engagement with the gasket 67 and the gas seal will be maintained at this gasket, independently of the gasket 60, the meter being suitably supported by a strap or other suitable means, previously mentioned. When the plate assembly is removed, since the gas seal is maintained at gasket 67, the old gasket 60 may be cut away and the new gasket 60 pushed upwardly into place without any gas leakage. As soon as the new gasket 60 is in place, the nut 62 may be threaded on the meter outlet 61 and tightened down, the union joint now having a dual seal at gaskets 60 and 60a. The nut 52 at the meter inlet 53 may now be tightened completing the installation of the replacement meter.

From the foregoing it will be apparent that the apparatus and method described permit convenient, rapid replacement of domestic gas meters without even momentary interruption of the gas service to the home monitored by the meter. It is possible that a dual version of the apparatus described can be utilized, with one unit connected at the meter inlet and the other at the meter outlet and with a gas flow by-pass conduit between the two units. Such an arrangement would obviate the necessity for the alternate (pressurized cylinder) gas supply.

I claim:

1. A device for facilitating the disconnection and reconnection of a gas meter having inlet and outlet fittings connected to a supply pipe and a service pipe respectively, said device comprising a top plate having an aperture extending therethrough sized to accommodate said gas meter service pipe, said plate being adapted to be releasably clamped about the gas meter service pipe with the gas meter outlet fitting extending substantially to said aperture at the underface of said top plate, a slide plate underlying said top plate with the adjacent faces of the plates contiguous, said slide plate being supported by said top plate, a translating member for moving said slide plate in a plane parallel to the plane of said top plate, a depression in the upper face of said slide plate forming a supply chamber in conjunction with the contiguous underface of the top plate, a supply passage formed in said top plate for providing an alternate supply of gas to said chamber, said chamber registering only with said supply passage when said slide plate is in a first position with relation to said top plate and registering with both said supply passage and said top plate aperture when moved to a second position by said translating member, said slide plate permitting the meter fitting to be moved out of registration with said top plate aperture and said service pipe and simultaneously to move said supply passage into registration with the top plate aperture and said service pipe as said translating member moves said slide plate from its said first to its said second position.

2. A device as claimed in claim 1 in which a layer of resilient material is interposed between the underface of said top plate and the adjacent upper face of said slide plate to provide a resilient interface between said surfaces.

3. A device as claimed in claim 1 in which a purging opening is provided in said top plate registering with the meter fitting when the meter fitting is out of register with said top plate aperture.

4. A device as claimed in claim 1 in which said slide plate is provided with a curved side surface adapted to engage the meter inlet fitting.

5. A device as claimed in claim 1 in which the support for said slide plate comprises a bottom plate secured in spaced relation to said top plate with said slide plate interposed therebetween.

6. A device as claimed in claim 5 in which said translating member includes a rotatable, threaded spindle journalled for rotation between said top and bottom plates and extending parallel thereto, the threaded portion of said spindle accommodating a correspondingly threaded portion of said slide plate whereby upon rotation of said spindle said slide plate is moved between its said first and second positions.

* * * * *